May 11, 1926.

W. D. SWIGGART ET AL 1,583,941

OIL LEVEL INDICATOR

Filed Dec. 22, 1920     2 Sheets-Sheet 1

Inventor
Will D. Swiggart
and
F. M. C. Usher
By Edson Bros, Attorneys

May 11, 1926.

W. D. SWIGGART ET AL

OIL LEVEL INDICATOR

Filed Dec. 22, 1920    2 Sheets-Sheet 2

1,583,941

Inventor
Will D. Swiggart
and
F. M. C. Usher.

By Edson Bros. Attorneys

Patented May 11, 1926.

1,583,941

UNITED STATES PATENT OFFICE.

WILL D. SWIGGART AND FRANCIS M. C. USHER, OF FULTON, KENTUCKY.

OIL-LEVEL INDICATOR.

Application filed December 22, 1920. Serial No. 432,513.

This invention relates to improvements in what may be termed oil-level indicators for crank cases of automobiles or other motor driven machinery.

The invention has for its object to provide, as indicated, for ascertaining the level of the oil present in the crank-case in a simple, effective and expeditious manner and with accuracy and so as to effect the aforesaid results with facility and to provide for the cleaning or blowing out of sediment, carbon and other accumulations in the oil indicator.

Other objects of the invention, together with the aforesaid, will be apparent from the following description of the construction, operation and application thereof, in connection with the annexed illustration.

The invention therefore consists of certain instrumentalities and features of construction substantially as hereinafter more fully disclosed and particularly defined by the appended claims.

The accompanying drawings illustrate the preferred embodiment, or one form, of my invention wherein it will be understood that various changes and modifications as relate to the detailed construction and arrangement of parts thereof may be made without departing from the spirit or scope of my invention as embraced within the claims, and in which drawings—

Figure 1:
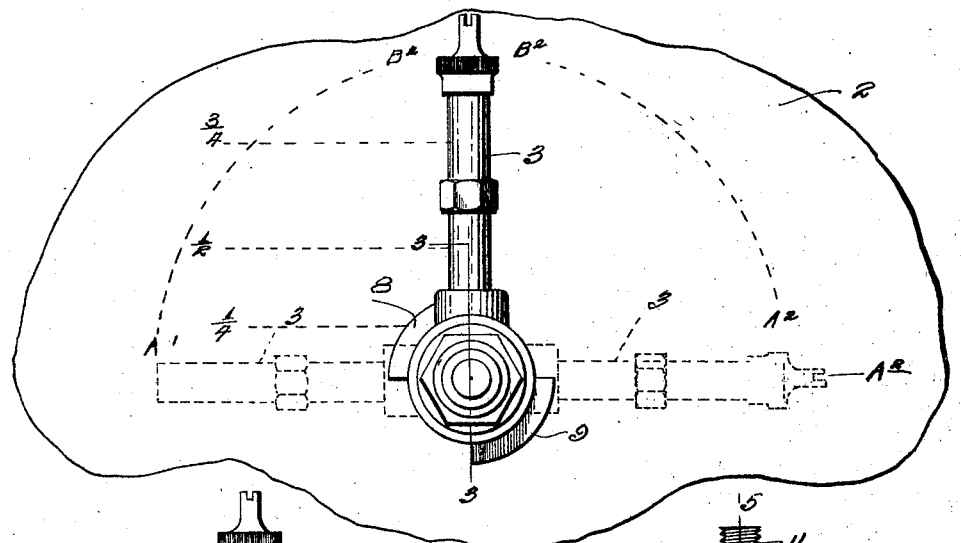
Figure 1 is an end elevation of our invention as applied for practical use to the crank-case of an automobile, for instance, wherein also are diagrammatically represented the practicing of the invention.
Figures 2, 3:
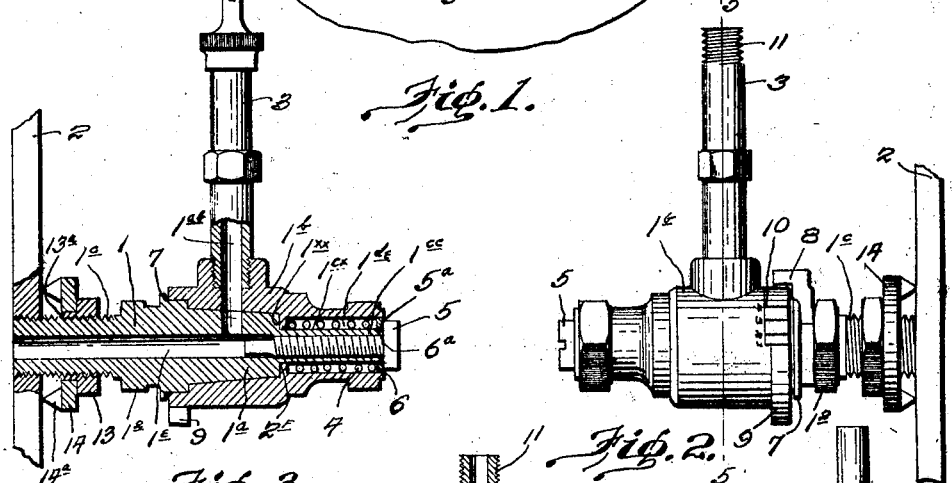
Figure 2 is a side elevation thereof.
Figure 3 is a vertical sectional view of the same taken on the line 3—3 of Figure 1.

As characteristic features of our invention, we employ a valve designated generally as 1 comprising preferably a cylindric valve-member proper $1^a$, contained within a cylindric casing or shell $1^b$ which is adapted to be manually rotated or turned upon the enclosed valve. The valve-member proper $1^a$ has a screw-threaded extension $1^c$ by means of which it may be readily attached to the oil or lubricant container, termed usually as the crank case, designated as 2, which screw-threaded extension has a polygonal formation $1^2$ for convenience in effecting a wrench-gripping hold or purchase thereon in connecting said extension to the crank-case, or disconnecting it therefrom. The valve proper $1^a$ has a bore or passage $1^e$ extending therethrough, also through its threaded extension $1^c$ and opening into the oil-container or crank-case 2, said bore or passage also extending continuously through the stem $1^{cc}$ of the valve. Said valve has a port $1^{ac}$ opening into the bore or passage $1^e$ of the valve-casing and adapted to register with an outtake-port $1^{ab}$ in the valve-casing $1^b$, said outtake port $1^{ab}$, alining the bore of an indicator standpipe tube 3, is suitably connected to the valve-casing. The stem $1^{cc}$ of the valve $1^a$ has a reduced portion $1^{cx}$, the base of the reduction forming a shoulder $1^{xx}$ upon which rests an internal flange or shoulder $2^f$ projecting from the bore of the valve-casing $1^b$ thus providing for seating the rotatable valve-casing upon the valve, as called for in practicing my invention, the purpose of which will be apparent later. The valve-stem reduction $1^{cx}$ is adapted to provide an annular or circular space $1^{de}$ therebetween and the interior of the valve-casing $1^b$, within which annular space is arranged a preferably helical resilient member or spring 4, the bottom of said annular space providing for supporting said resilient member or spring. The spring or resilient member 4 is held or seated in place by means of a washer 6 adapted to rest thereon and the screw 5, whose head overlies said spring, exerting pressure thereon, the washer having a projection at $5^a$ cooperating with a corresponding mutilation 6ᵃ in the valve-stem 1ᶜᶜ or planed off portion thereof, retaining the washer against inadvertent movement. The primary purpose of the aforesaid arrangement is to provide for resiliently seating the rotatable valve enclosing casing and to retain the same effectively oil tight in place.

The action of the rotatable valve-enclosing member is such that, when said member is turned by requisitely grasping and actuating the indicator tube, the oil in the crank-case, it is obvious, will flow from said crank-case as the indicator tube bore is thus brought into alinement with the bore or passage of the valve, thus providing for ascertaining the oil-level in the crank-case.

Suitably provided exteriorly preferably upon an enlargement 7 of the valve 1ᵃ, adjacent the rotatable-valve enclosing casing 1ᵇ, is a stop 8, and upon the rotatable valve casing is provided a stop 9 adapted to engage the stop 8 as the rotatable valve casing reaches and limits its maximum movement and wide open position, the registration of one "gage" of oil then being indicated by the requisite one of the indices or graduations 10, provided upon the exterior surface of the rotatable valve-casing 1ᵇ, adjacent the stops 8, 9, as clearly disclosed. As disclosed by the diagrammatic showing of Fig. 1, the dotted lines and their associated indicia or legends may read as follows, beginning at the outer end of the tube 3: A¹ and A² indicate one and two "gages", respectively, and ¾, ½ and ¼ indicate corresponding heights or levels of the oil in the oil indicator, according to the positioning or disposing of the indicator tube intermediate the aforesaid "gage" registrations, whereby it may be ascertained when the oil supply may require replenishing, as is thought obvious and thus obviate the many troubles and disadvantages as have otherwise heretofore been experienced in this connection. It will be understood that the valve 1ᵃ is constantly open to the indicator tube 3, from B² to A¹ as suggested by dotted lines in Figure 1, and always closed from B² to A² as suggested by dotted line in the same figure, the indicator tube stopping at A², it then being in fully closed position. Also the indicator tube is exteriorly screw-threaded at its outer end, as at 11, to provide for effecting by the aid of well known facilities, connection therebetween and an air-pump for cleaning out the oil indicator, thus providing for the removal of all non-lubricating elements, as carbon, also all other accumulations or sediment, sticky-substances or other extraneous matter.

Upon the valve extension 1ᶜ is a polygonal nut formation 1ᶻ for the convenient application of a wrench thereto in threading or attaching the valve or rather the extension 1ᶜ to the crank-case 2. Also upon this valve-extension 1ᶜ is threaded a nut 13 having an annular collar 13ᵃ upon which collar is sleeved a washer 14 which washer has projecting from one face thereof preferably conical projections or teats 14ᵃ with their tapering surfaces or points adapted to engage the crank-case 2, which therefore serve to lock the washer, together with the nut 13, into position against inadvertent turning. This arrangement provides, by the employment of what may be termed the equalizing points (14ᵃ), for equalizing somewhere around a surface which may be oval or not flat or plane, whereby the washer 14 may rest flush with the surface of the nut 13.

Figures 4, 5, 6:
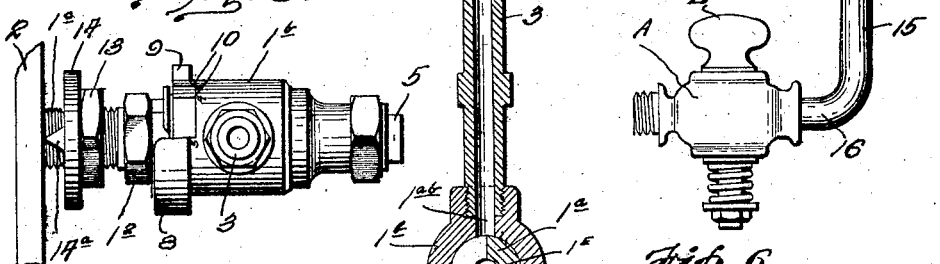
Fig. 4 is a plan view of the invention.
Fig. 5 is a vertical section taken on the line 5—5 of Fig. 2.
Fig. 6 is a modification showing the adaptation of the device to the ordinary petcock.
Figures 7, 8:
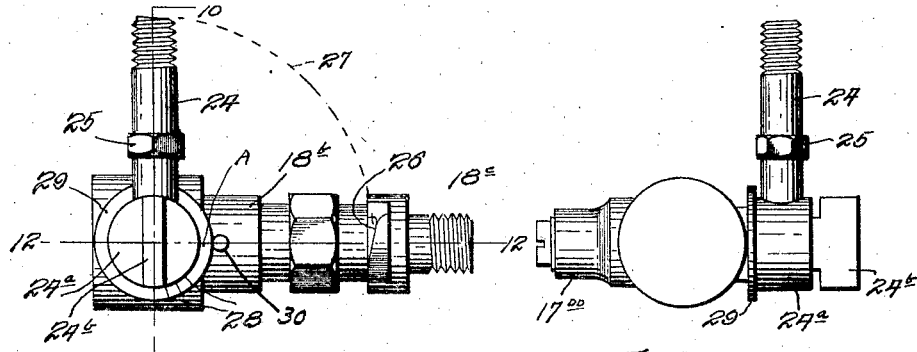
Fig. 7 is a side elevational view of another embodiment or form of my invention, with the indicator tube at just its open or feeding position.
Fig. 8 is a similar elevation viewing at right angles to Fig. 7.
Figures 9, 10:
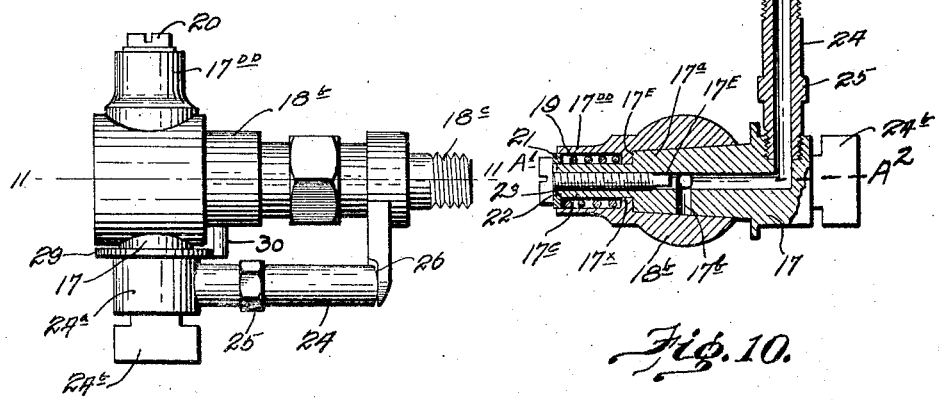
Fig. 9 is a plan view of the device with the indicator tube disposed or turned downwardly into a horizontal position.
Fig. 10 is a sectional elevation taken on the line 10—10 of Fig. 7.
Figures 11, 12:
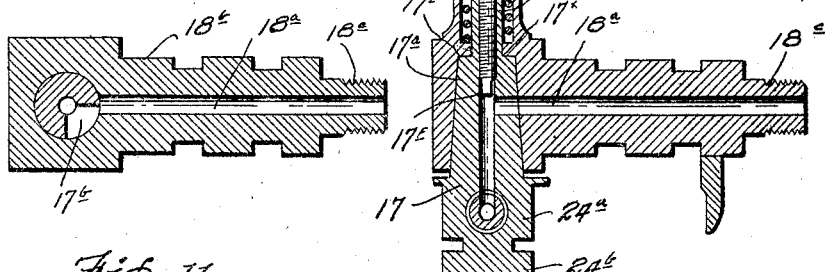
Fig. 11 is a section taken on the line 11—11 of Fig. 9.
Fig. 12 is a horizontal section taken on the line 12—12 of Fig. 7.

As disclosed by Fig. 6, showing the adaptation of our invention to the ordinary petcock, designated as A, it will be seen that the characteristic feature thereof consists principally in connecting the indicator tube to the discharge or outlet portion of said cock, said indicator tube, designated herein as 15, being formed in preferably J letter contour or outline with its curved terminal applied to have a rotatable connection, as at 16, with said outlet portion and its bore adapted to have registration with the bore of the pet valve or cock as in the above described embodiment of our invention, as will be readily appreciated.

It is apparent that our invention is equally applicable to any type of motor or engine driven by gaseous fluid or gasoline.

Referring to the further embodiment of our invention as disclosed by Figs. 7, 8, 9, 10 and 11 of the drawings, we may provide, in lieu of the above described arrangement of parts, a valve designated generally as 17 comprising a valve proper 17ᵃ of plug-like type, with its port 17ᵇ of cavity or recess-like formation opening into a bore or passage 18ᵃ of the body-portion or casing 18ᵇ of the valve, said casing being formed with an elongated tubular portion or extension suitably screw-threaded as at 18ᶜ for attachment to the oil-crank case. The valve proper 17ᵃ, which is also elongated or extended as at 17ᶜ extending through the valve-body or casing 18ᵇ transversely or at right angles to the bore or passage 18ᵃ of said body and continued through a lateral tubular stub or extension 17ᵈᵈ of said body or casing. The valve-proper-elongation 17ᶜ is exteriorly-stepped or reduced as at 17ˣ and has a bore or passage 17ᶠ. The casing 18ᵇ is provided with an internal annular flange 17ᵉ a short distance from one end, the resultant shoulder of the stepped elongation 17ᶜ being adapted to engage the shoulder 17ᵉ of the valve-body or casing 18ᵇ to provide for suitably limiting the insertion of the slightly tapering valve-proper, in seating it in the corespondingly shaped bore of the valve-body. The valve-proper-elongation 17ᶜ is of such cross-section or diameter as to allow of passing the same interiorly of the annular flange 17ᵉ and thus provide an annular space intermediate the elongation 17ᶜ and the inner wall of the tubular extension 17ᵈᵈ, to receive a cushioning spring 19 whose inner end contacts with the annulus or flange 17ᵉ. The spring 19 thus surrounds the elongation 17ᶜ of the valve-proper, 17ᵃ and provides for cushioning the valve, a retaining screw 20 being threaded into the outer end of the bore or passage 17ᶠ of the valve-proper elongation 17ᶜ and a washer 21, having its inner surface provided with a projection 22, and applied to the outer end of the spring 19, with the projecting portion of the head of said screw resting upon and holding said washer and spring in effective position when said screw is screwed to its final position. The valve elongation 17ᶜ has its extreme outer terminal also mutilated or right-lined, as at 23, to aline with, and engage the corresponding projection 22 of the washer 21, to provide for the retention of said washer against turning.

An indicator tube 24, having its outer end preferably screw-threaded for making connection therewith, by a hose or otherwise, of an air-pump for blowing or cleaning out said tube, is suitably fixed or screwed into preferably an enlargement 24ᵃ of one end of the valve 17ᵃ and transversely thereto, and having its bore or passage in communication with the bore or passage 18ᵃ of the valve to provide for the flow of the oil from the container, in the present instance the crank-case of a motor, and thus provide for indicating the level of the oil in said container or crank-case. The tube 24 is preferably provided with a nut-like formation 25 for convenience in applying thereto a wrench in angularly adjusting or moving said tube in ascertaining the level of the oil in the container; also the valve-enlargement 24ᵃ may be provided with an end key-like formation 24ᵇ for adjusting or moving said tube, if desired. The tubular extension of the valve-body or casing 18ᵇ has projecting laterally therefrom what may be termed a seat 26 for the engagement or contacting therewith of the free end of the tube in limiting the extreme-turning movement thereof and accordingly the valve, in one direction, as indicated by the dotted line 27, to the right, Fig. 7; the position of the tube as shown in this figure is its initial, indicating two gages of oil in the oil-container; when it is in a position indicated by dotted line A, it will indicate the height or level of the oil in the container anywhere from B² to A¹. The tube adjusted to position indicated by dotted line A represents one gage of oil present, and provides for closing the valve all the way from B² to A², the tube then being turned to the left and contacting with seat 26. These adjustments are provided for by the graduations 28 arranged upon an annular member 29 secured to the member 24ᵃ, carried by the valve 17ᵃ, and a pointer or indicator 30 fixed upon the casing 18ᵇ.

We claim—

1. An oil level indicator comprising a valve casing having a conduit therethrough and a port, a valve having a standpipe said valve being rotatably mounted on one end of said valve casing, said standpipe being adapted to normally lie adjacent to and in spaced parallel relation with said valve casing, means whereby said standpipe is out of communication with said conduit when in this position, means whereby said valve is only capable of rotation of a half of a revolution from this normal position, and means whereby said standpipe is in communication with said conduit when the valve has been rotated substantially a quarter of a revolution.

2. An oil level indicator comprising, a valve casing having a conduit therethrough, a valve having a standpipe said valve being rotatably mounted on one end of said valve casing said standpipe being adapted to normally lie adjacent to and in spaced parallel relation with said valve casing, and a lateral extension carried by the other end of the valve casing and forming a seat for the free end of the standpipe, means whereby said valve is only capable of rotation for a half of a revolution, the standpipe being out of communication with the conduit during the first quarter of the revolution, and in communication with said conduit during the other quarter.

3. In an oil level indicator a tubular indicating member adapted to be secured to a receptacle, a nut having screw-threaded engagement with said tubular member adjacent the receptacle and having a sleeve, a collar arranged on said sleeve and having tapered, pointed projections adapted to engage the surface of the receptacle when the nut is tightened, whereby the collar will be always flush with the surface of the nut, and will be locked against inadvertent turning.

In testimony whereof, we affix our signatures.

WILL D. SWIGGART.
FRANCIS M. C. USHER.